Feb. 6, 1923.
V. W. MOYER ET AL.
TEMPER SCREW.
FILED JAN. 19, 1922.
1,444,517.
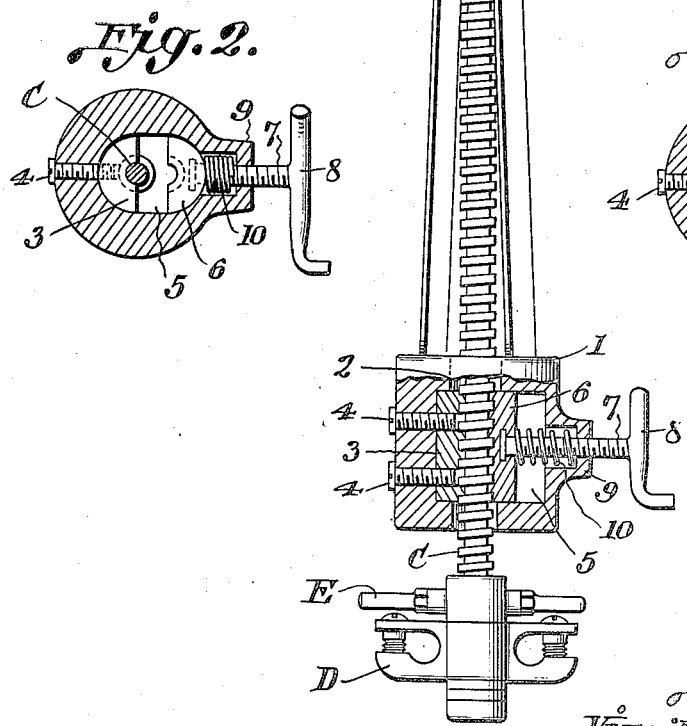
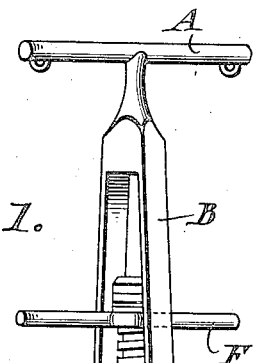
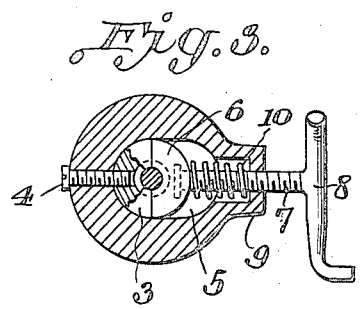
Inventors
Virgil W. Moyer
Robert V. McMullen
by their Attorneys
Baldwin Wight Patented Feb. 6, 1923.

1,444,517

UNITED STATES PATENT OFFICE.

VIRGIL W. MOYER AND ROBERT V. McMULLEN, OF PAWHUSKA, OKLAHOMA.

TEMPER SCREW.

Application filed January 19, 1922. Serial No. 530,329.

*To all whom it may concern:*

Be it known that we, VIRGIL W. MOYER, a citizen of the United States, and a resident of Pawhuska, in the county of Osage and State of Oklahoma, and ROBERT V. McMULLEN, a citizen of the United States, and a resident of Pawhuska, in the county of Osage and State of Oklahoma, have invented certain new and useful Improvements in Temper Screws, of which the following is a full, clear, and exact description.

Our invention relates to the temper screw connection between the oscillatory beam, and the cable or similar member in apparatus for drilling oil wells and similar machinery, and has for an object to so improve the temper screw connection that rapid adjustment may be made easily.

Another object is to provide a connection in which the parts upon which the greatest wear comes may be easily and readily replaced without the necessity of providing an entire new apparatus.

Other objects of our invention will be apparent from the following detailed description and the appended claims.

In the drawings:—

Figure 1 is a perspective view, with parts in section.

Figure 2 is a cross section showing the screw-engaging members in open position.

Figure 3 is a similar cross section showing the screw-engaging members in closed position.

The device comprises the usual cross bar A which is connected to the operating mechanism, the reins B, the temper screw proper C, a member D to which the rope or cable clamping means may be attached, and which is rotatably carried by the temper screw C, a handle member E rigidly attached to the temper screw C and used to give it slow adjustment while the device is in use, and a guiding member F rotatably carried by the upper end of the temper screw C and passing between the reins. All of these parts are old and well known and in themselves form no part of our invention.

Carried by the lower end of the reins B and preferably integral therewith is a box 1 of a generally cylindrical shape and having a central opening 2 of larger diameter than the temper screw. At a little distance from each end of the box this opening is enlarged to form a chamber 5. Fastened to one side of this chamber by screws 4 is a fixed liner 3 which is semi-cylindrical in shape and screw threaded on its inner side to engage the temper screw. On the other side of the temper screw is a movable liner 6 similar in shape to the liner 3 and screw threaded to engage the temper screw. A member 7 having a handle 8 is screw threaded through a boss 9 of the box 1 and at its inner end engages by a button and slot connection with the movable liner. This connection should be such that the screw 7 may rotate independently of the liner 6 but the two will move longitudinally together. The connection illustrated is a common one and often used where such a result is desired. A spring 10 surrounds the screw 7 within the chamber 5 and its branch in the boss, and tends to prevent rattling and lost motion of parts.

The operation of the device may be briefly stated. With the parts in operative position as shown in Figures 1 and 3, the screw may be slowly adjusted as desired by rotating it through the handle E. When it is desired to adjust it rapidly in the other direction, the handle 8 is rotated to move the movable liner 6 to the position shown in Figure 2 where the screw will not be held but may be manually adjusted to any desired position. Then a reverse rotation of the handle 8 will move the liner 6 back to engaging position.

The liner members may be readily replaced when worn, since they are separate from the box. The box is in one piece and not split as in some previous constructions and is therefore more durable and satisfactory in every way. Details of form, size, and arrangement of parts can be varied without departing from our invention which is set forth in the claims.

We claim as our invention:

1. The combination with a temper screw of a box having a central opening therethrough for said screw, a fixed liner within said opening to engage one side of the screw, a movable liner to engage the other side of the screw, and means passing through one side of the box whereby the movable liner may be adjusted into and out of engagement with said screw.

2. The combination with a temper screw of a box having a central opening therethrough for said screw, an enlarged chamber communicating with said opening, a fixed liner within said chamber and normally engaging one side of said screw, a movable liner within the chamber and normally engaging the other side of the screw, and means passing through one side of the box and connected to said movable liner to move it into and out of engagement with the screw.

3. The combination with a temper screw of a one piece box having a central opening therethrough for said screw, a fixed liner within said opening and normally engaging one side of the screw, a movable liner within said box and normally engaging the other side of the screw, and means screw threaded through one side of the box and operatively connected to the movable liner to move it into and out of engagement with the screw.

4. The combination with a temper screw of a one piece box therefor having a central chamber, fixed and movable liners within said chamber and normally in engagement with the screw, and manually operative means passing through one side of the box and into the chamber and which is connected to the movable liner to move it into or out of engagement with the screw.

In testimony whereof, we have hereunto subscribed our names.

VIRGIL W. MOYER.
ROBERT V. McMULLEN.